(12) United States Patent
Aiuto et al.

(10) Patent No.: US 9,265,015 B2
(45) Date of Patent: Feb. 16, 2016

(54) DETECTING INTERACTION AMONG ENTITIES VIA PROXIMITY

(71) Applicant: Whistle Labs, Inc., San Francisco, CA (US)

(72) Inventors: Chris Aiuto, San Francisco, CA (US); Kevin Lloyd, San Francisco, CA (US); Jason Krikorian, San Francisco, CA (US)

(73) Assignee: WHISTLE LABS, INC., San Francisco, CA (US)

(*) Notice: Subject to any disclaimer, the term of this patent is extended or adjusted under 35 U.S.C. 154(b) by 274 days.

(21) Appl. No.: 13/843,484

(22) Filed: Mar. 15, 2013

(65) Prior Publication Data

US 2014/0302783 A1    Oct. 9, 2014

(51) Int. Cl.
| | |
|---|---|
| *H04W 24/00* | (2009.01) |
| *H04W 52/36* | (2009.01) |
| *H04W 52/16* | (2009.01) |
| *H04W 52/24* | (2009.01) |
| *H04W 64/00* | (2009.01) |
| *G01S 5/02* | (2010.01) |
| *G01S 11/06* | (2006.01) |
| *H04B 17/318* | (2015.01) |
| *H04B 5/00* | (2006.01) |

(52) U.S. Cl.
CPC ........... *H04W 52/367* (2013.01); *G01S 5/0284* (2013.01); *G01S 11/06* (2013.01); *H04B 5/0031* (2013.01); *H04B 5/0037* (2013.01); *H04B 17/318* (2015.01); *H04W 52/16* (2013.01); *H04W 52/245* (2013.01); *H04W 64/00* (2013.01)

(58) Field of Classification Search
USPC .............. 455/41.1, 41.2, 456.1, 456.3, 456.5, 455/456.6, 67.11, 67.13; 342/118, 126, 342/450, 458
See application file for complete search history.

(56) References Cited

U.S. PATENT DOCUMENTS 6,321,083 B1 * 11/2001 Vaara et al. .................... 455/446
6,348,889 B1 * 2/2002 Ashihara et al. ................ 342/70
(Continued)

FOREIGN PATENT DOCUMENTS

| EP | 2 073 514 A2 | 6/2009 |
|---|---|---|
| GB | 2 309 843 A | 8/1997 |
| WO | WO 2005/091915 A2 | 10/2005 |
| WO | WO 2012/027505 A2 | 3/2012 |

OTHER PUBLICATIONS

European Patent Office, "Search Report" in application No. PCT/US2014/028307, dated Nov. 14, 2014, 6 pages.

(Continued)

*Primary Examiner* — Tuan A Tran
(74) *Attorney, Agent, or Firm* — Hickman Palermo Becker Bingham LLP (57) ABSTRACT

Approaches, techniques, and mechanisms are disclosed for determining interaction among animals via proximity relationships. An interaction between two or more animals may generally refer to any action by an animal that influences one or more other animals and that may be inferred based on a detected physical proximity relationship between the animals. According to various embodiments, proximity relationships between animals may be detected based on determining an approximate physical distance between computing devices associated with the animals. In other embodiments, proximity relationships between animals may be detected based on detecting the co-location of computing devices associated with the animals.

23 Claims, 5 Drawing Sheets

(56) References Cited

U.S. PATENT DOCUMENTS

| | | | |
|---|---|---|---|
| 7,970,390 B2* | 6/2011 | Fraccaroli | 455/414.3 |
| 8,463,280 B1* | 6/2013 | Lim et al. | 455/452.1 |
| 8,824,316 B2* | 9/2014 | Lipman et al. | 370/252 |
| 2006/0095349 A1 | 5/2006 | Morgan et al. | |
| 2009/0221298 A1 | 9/2009 | Hanner | |
| 2010/0159833 A1* | 6/2010 | Lewis et al. | 455/41.3 |
| 2010/0172274 A1* | 7/2010 | Wu et al. | 370/311 |
| 2011/0149934 A1 | 6/2011 | Dickson, Jr. et al. | |
| 2012/0249300 A1 | 10/2012 | Avital et al. | |

OTHER PUBLICATIONS

European Claims in application No. PCT/2014/028307, dated Nov. 2014, 5 pages.

* cited by examiner

DETECTING INTERACTION AMONG ENTITIES VIA PROXIMITY

TECHNICAL FIELD

The present disclosure generally relates to detecting a physical proximity relationship between computing devices. The disclosure relates more specifically to using wireless connection characteristics to determine physical proximity relationships between computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Mobile computing devices are a pervasive form of computing technology. Examples of mobile computing devices include smart phones, tablets, wearable computers, computing devices embedded into other objects, and any number of other increasingly small and portable computing devices. The small form factor and portability of mobile computing devices has resulted in an environment where people are often in near constant engagement with some form of computing device.

Mobile computing devices commonly are capable of some form of wireless interconnectivity. Wireless technologies such as Wi-Fi, Bluetooth, and cellular have enabled mobile computing devices to interconnect directly with other devices and with higher level device networks without the need for a physical network connection at the device. These wireless technologies have enabled mobile computing devices, and users of those devices, to easily communicate and exchange data, even as users move from place to place.

Despite the increasing amount of interaction that occurs in the virtual environment enabled by mobile computing devices and wireless technologies, personal interaction in the physical world among humans, and among humans and non-human animals, continues to be an important and valued activity. For example, the amount of time spouses spend in each other's company, or the amount of time that a pet owner spends in the company of a pet, may have an influence on the quality of the relationship between the parties. It would be useful to leverage the pervasiveness of wireless computing devices to better monitor and understand personal interactions that occur among both humans and non-human animals in the physical world. To do so, computers or their users need data that characterizes the proximity of devices to one another over time. However, detecting a physical proximity relationship between computing devices has been challenging using past technology and prior techniques do not provide reliable solutions to determine physical proximity relationships between computing devices.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural Overview
  3.0 Functional Overview
    3.1 Determining an Approximate Physical Distance Between Devices
    3.2 Detecting Co-location of Devices
  4.0 Implementation Mechanism—Hardware Overview
  5.0 Extensions and Alternatives
  1.0 General Overview Approaches, techniques, and mechanisms are disclosed for determining interaction among animals and other entities via proximity relationships. As used herein, the term animal generally may refer to any animate entity including humans, non-human animals (e.g., animals kept as pets, livestock, wildlife), and in some embodiments may include animate or inanimate objects (e.g., robots, vehicles, household objects, etc.). An interaction between two or more animals may generally refer to any action by an animal that influences one or more other animals. For example, an interaction between a human and a pet animal may include the human spending time with the pet animal at home or taking the pet animal for a walk; an interaction between two humans may include the humans having a meal together at a restaurant. In an embodiment, these and other similar interactions may be inferred based on detecting that a first animal (e.g., a human, non-human animal, non-living object, etc.) and a second animal (e.g., another human, non-human animal, non-living object, etc.) are in a physical proximity relationship with one another.

According to various embodiments, physical proximity relationships between animals may be detected based on determining an approximate physical distance between computing devices associated with the animals. In other embodiments, proximity relationships between animals may be detected based on detecting the co-location of computing devices associated with the animals. In this context, a computing device that is associated with a particular animal generally refers to a computing device that the particular animal uses, carries, wears, or otherwise interacts with. For example, a person may be associated with a mobile computing device such as a smart phone that the person uses and carries throughout the day. As another example, a pet animal may wear a pet accessory that contains an embedded computing device, such as part of a pet collar, tag, or other wearable item. As further described herein, in various embodiments, approximate physical distances between computing devices and the co-location of computing devices may be detected based on characteristics of wireless connections associated with the computing devices.

Determining interaction among animals may be useful, for example, for the purposes of making inferences about a relationship between two particular animals. For example, it may be desired to detect and record the occurrence of interactions between a human and a pet animal owned by the human to better understand the nature and quality of their relationship. For example, analysis of recorded interactions may indicate whether the human is spending a desirable amount of time interacting with the pet animal, or vice versa. When the human is a hired caretaker, such as a paid dog-walker, kennel operator, animal healthcare provider or other service provider, the analysis may enable a manager of the service provider and/or the owner of the non-human animal to determine whether staff of the service provider are spending the amount of time with the non-human animal that is expected based on a contract, service agreement, or other understanding or arrangement between the parties.

2.0 Structural Overview

One embodiment provides a system configured for determining interaction among animals based on a distributed computer-based architecture that includes networked tracking devices, mobile devices, and a centralized application server computer. The networked tracking devices and mobile devices may be physically located practically anywhere at any given time. For example, a mobile device may be used by a person within the person's home and also carried with the person when the person travels to work and other locations. As another example, a tracking device may be embedded in a pet collar worn by a pet animal and carried wherever the animal moves. In an embodiment, a centralized application server is configured to collect, store, and analyze data received from tracking devices and mobile devices and to facilitate user access to the system.

Figure 1:
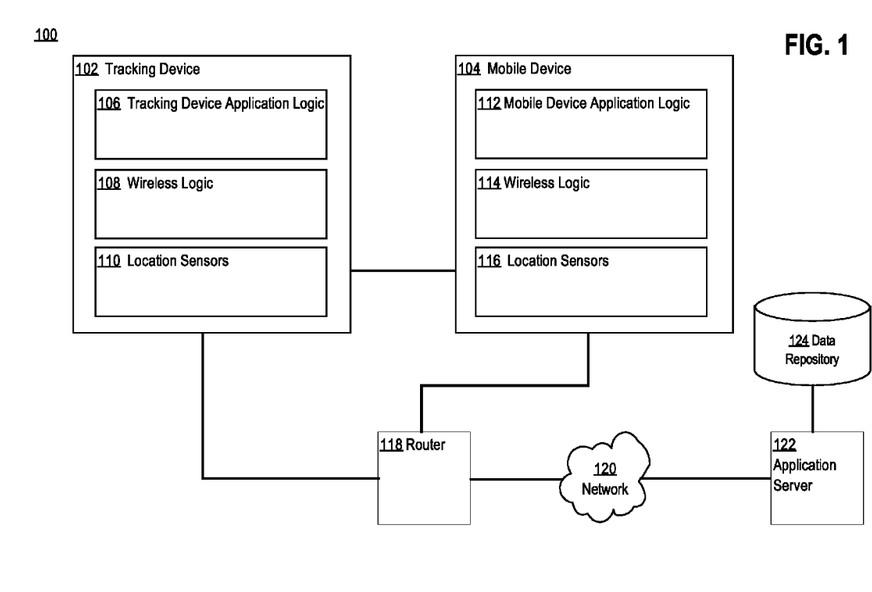
FIG. 1 illustrates a computer system in accordance with an embodiment.

FIG. 1 illustrates a computer system in accordance with an embodiment. Although a specific system 100 is described herein, other embodiments are applicable to any system that can be used to perform the functionality described herein. Components of the system 100 may be connected directly or indirectly through one or more instances of a network such as a Local Area Network (LAN), Wide Area Network (WAN), an internetwork such as the public Internet, an Intranet, Extranet, satellite or wireless links, etc. Alternatively or additionally, any number of devices connected within the network may also be directly connected to each other through wired or wireless communication segments.

In an embodiment, the system 100 includes one or more tracking devices (e.g., tracking device 102), one or more mobile devices (e.g., mobile device 104), a router 118, a network 120, an application server 122, and a data repository 124 coupled to one another as indicated by lines in FIG. 1.

In an embodiment, a tracking device 102 generally represents any device which may be used to wirelessly communicate with one or more other devices and to collect, store, and analyze data related to the location and movement of the tracking device 102, which may be referred to herein as location data. A tracking device 102 may be a standalone computing device, a computing device embedded as part of another object (e.g., as part of a wearable pet accessory, pet clothing, tag, or other attachment to a non-human animal), or any other computing device that may be associated with an animal.

In an embodiment, tracking device 102 comprises tracking device application logic 106, wireless logic 108, and location sensors 110. Tracking device application logic 106 may be configured to receive location data that is collected by one or more location sensors 110, to analyze and store the location data, and to send the location data to other devices such as a mobile device 104 and/or application server 122. In an embodiment, tracking device application logic 106 may be implemented using firmware coupled to a microcontroller, one or more FPGAs, ASICs, or other combinations of firmware and digital computing hardware. Tracking device application logic 106 also may be configured to receive and analyze data generated by wireless logic 108 related to the status of wireless connections established between tracking device 102 and other devices. Tracking device application logic 106 may be configured for enabling user configuration of tracking device 102, including configuration of personalized user settings, network settings, and device power settings.

In an embodiment, tracking device application logic 106 may be configured to identify the device with a centralized service such as, for example, a service hosted by an application server 122. For example, tracking device 102 may be associated with a unique identifier such as an international mobile equipment identity (IMEI) number, a MAC address, serial number, user-supplied account information, or any other value that may be supplied by tracking device application logic 106 to identify a tracking device 102. The identification of tracking device 102 with a service hosted by application server 122 may be used, for example, to associate data collected from a tracking device 102 with a particular user account registered with the service. Application server 122 broadly represents any of a special-purpose computer or a process hosted on or executing in a general-purpose computer, either of which may be associated with the premises of a service provider or may be implemented using a cloud service provider or other hosting agent.

In an embodiment, location sensors 110 generally represent any sensors capable of detecting information associated with the physical presence of a tracking device 102 and which may be represented as location data. Location data may include, without limitation, latitudinal and longitudinal coordinates indicating a geographical location, elevation measures, cardinal direction information, and movement or acceleration information. For example, location sensors 110 may comprise one or more of Global Positioning System (GPS) components, motion sensors (e.g., accelerometers), rotation sensors (e.g., gyroscopes), compasses, and magnetometers. A tracking device 102 may collect location data from location sensors 110 at specified intervals, in response to detecting movement of the tracking device 102, or in response to receiving a request for the data from another device.

In an embodiment, wireless logic 108 is configured to facilitate establishing and maintaining wireless connections between tracking device 102 and one or more other devices including, for example, a mobile device 104 and router 118. Typical wireless connection types that may be supported by wireless logic 108 include, without limitation, Wi-Fi (IEEE 802.11), WiMAX, cellular, Bluetooth, ZigBee, near field communication (NFC), and infrared connections. Wireless logic 108 may be operable to establish wireless connections with different devices using different wireless connection types. For example, wireless logic 108 may be configured to establish a Bluetooth connection with mobile device 104 and a Wi-Fi connection with router 118.

In an embodiment, wireless logic 108 may be configured to maintain one or more connection status parameters for an established connection. Example connection status parameters maintained by wireless logic 108 may include signal strength parameters including a first parameter indicating the current strength of a wireless radio-frequency signal transmitted by tracking device 102 and a second parameter indicating the current strength of a wireless radio-frequency signal received by tracking device 102 (as measured by tracking device 102). Signal strength parameters may be maintained as a value representing the signal strength in decibels per milliwatt (dBm) or in any other units.

In an embodiment, wireless logic 108 may store and maintain a transmit power table associated with the transmit signal power of a tracking device 102. In general, a transmit power table may be used by a device such as tracking device 102 to alter the power of wireless signals transmitted by the device based on current connection conditions with another device. For example, a transmit power table may include entries that each specify a transmit power level to be used for a given detected power level of a signal received from the other device. In an embodiment, in response to detecting a particular received signal power level, wireless logic 108 may be configured to determine a corresponding power table entry and to cause tracking device 102 to begin transmitting at the transmit power level specified by the entry. The transmit power table may be stored in volatile or persistent data storage in tracking device 102 such as RAM or NVRAM such as flash memory.

All components of the tracking device application logic 106, wireless logic 108, and location sensors 110 may be integrated into a single unit of software, firmware, hardware, or a combination thereof. Thus, the separate blocks shown in FIG. 1B are provided solely to illustrate one clear example.

In an embodiment, mobile device 104 generally represents any device which may be used to wirelessly communicate with one or more other devices and to perform aspects of collecting and analyzing location data related to mobile device 104. Examples of a mobile device 104 include, without limitation, a smart phone, a cellular phone, a laptop computer, a tablet computer, a personal digital assistant (PDA), etc. In an embodiment, mobile device 104 includes mobile device application logic 112, wireless logic 114, and location sensors 116, each of which may comprise one or more elements of firmware, hardware, software, or a combination thereof in various embodiments that can implement the functions described herein.

In an embodiment, mobile device application logic 112 is configured for communicating with a tracking device 102, performing one or more functions relating to collecting and analyzing location data related to mobile device 104, and communicating with the application server 122. In one embodiment, mobile device application logic 112 may be implemented as part of an application program or app configured to execute on the iOS or Android operating system. In other embodiments, mobile device application logic 112 may be implemented as a combination of programming instructions written in any programming language (e.g., C++ or Java) and hardware components (e.g. memory, CPU time) that have been allocated for executing the program instructions on a mobile device 104.

In an embodiment, wireless logic 114 may be compatible with wireless logic 108 and configured to manage the communicative coupling of a mobile device 104 with one or more other devices, including tracking device 102 and router 118. Similar to wireless logic 108 of tracking device 102, wireless logic 114 may facilitate establishing and maintaining wireless connections in any number of different wireless connection technologies and include functionality to maintain connection status parameters for active connections.

In an embodiment, location sensors 116 may generally include sensors similar to location sensors 110 of tracking device 102, as described above, and generally are configured to collect and report location data associated with a mobile device 104.

In an embodiment, a tracking device 102 and a mobile device 104 may be communicatively coupled to the application server 122 via router 118 and network 120. Router 118 generally represents a networked computing device configured for providing access to a network 120 and comprising a wireless access point enabling wireless connections from devices such as a tracking device 102 and mobile device 104. Network 120 broadly represents one or more local area networks, wide area networks, global interconnected networks such as the public internet, or a combination thereof. Thus, router 118 and network 120 enable mobile device 104 to communicate with application server 122 and to provide data that is obtained from tracking device 102 or that is generated at the mobile device as part of the collection and analysis functions.

In another embodiment, a tracking device 102 or mobile device 104 may be coupled to a network 120 via a cellular or other wireless wide area network connection and may not communicate directly with a traditional router, such as router 118. A tracking device 102 or mobile device 104 may also be indirectly coupled to a network 120 via a connection with another device that is connected to network 120. For example, a mobile device 104 may be coupled to a network 120 via a cellular connection and a tracking device may be indirectly couple to network 120 via a Bluetooth or other direct wireless connection with the mobile device 104.

In an embodiment, application server 122 generally is configured to receive and analyze data sent from one or more tracking devices and mobile devices. For example, application server 122 may include functionality to receive data including location data and other information, store the data in a data repository 124, and perform analyses and other operations based on the received data. Application server 122 may facilitate user access to the system via graphical user interface displays accessible by a tracking device 102, mobile device 104, or other device. For example, the application server may be configured to provide a World Wide Web-based management interface, or portal, that enables users to securely access and configure and view various aspects of the system relative to each user. For example, users may interact with the portal to register user devices with the system, to view analyses and statistical views related to data collected from the user's devices, and to perform other operations. In various embodiments, the specific computational functions involved in performing analysis of data may be divided among the application server and the mobile device 104 in different ways depending on the processing power available in the mobile device.

In an embodiment, the data repository 124 generally represents any data storage device that may be configured to store data (e.g., local memory on application server 122, shared memory, multiple servers connected over the internet, systems within a local area network, a memory on a mobile device, etc.). Various elements or portions of data stored in the data repository 124 may be distributed and stored in multiple data repositories (e.g., servers across the world). In one or more embodiments of the invention, the data repository 124 includes flat, hierarchical, network based, relational, dimensional, object modeled, or data files structured otherwise. For example, data repository 124 may be maintained as a table of an SQL database.

3.0 Functional Overview

3.1 Determining an Approximate Physical Distance Between Devices

Figure 2:
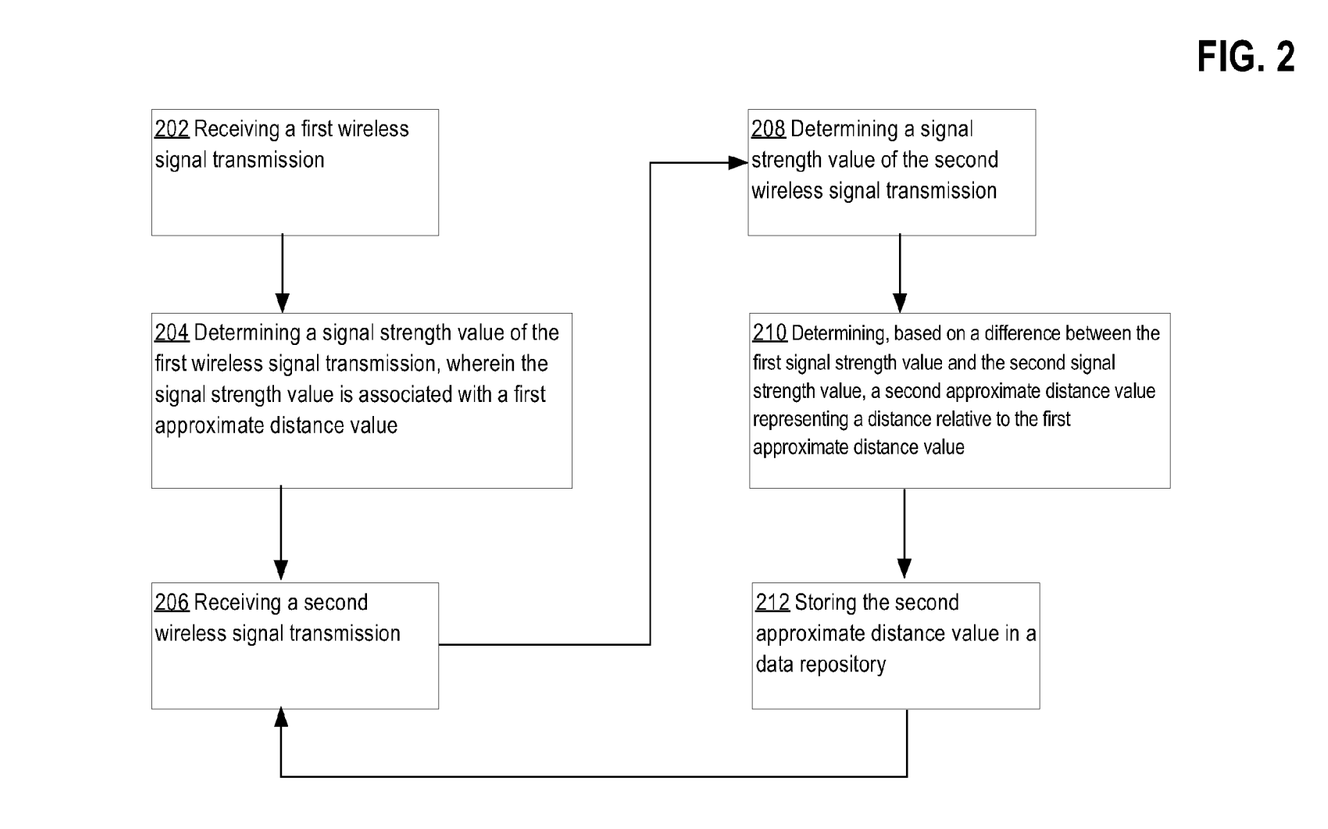
FIG. 2 illustrates a process of determining an approximate physical distance between two computing devices, according to an embodiment.

FIG. 2 illustrates an example process of determining an approximate physical distance between two devices. In an embodiment, determining an approximate physical distance between two devices may be used to infer information about interactions between animals associated with the devices, as further described herein. In an embodiment, one or more of the steps described below may be omitted, repeated, or performed in a different order. The specific arrangement or order shown in FIG. 2 is not required.

In Step 202, a first wireless signal transmission is received. In this context, a wireless signal transmission generally may refer to any radio signal transmitted from a device as part of a wireless network. For example, a first device may receive a wireless signal transmission from a second device as part of a wireless personal area network (PAN) connection between the first device and the second device (e.g., a Bluetooth, Z-Wave, or ZigBee connection), as part of a process of establishing a wireless connection between the first device and the second device, or based on any other wireless signal that a second device may transmit.

In an embodiment, the first wireless signal transmission may be received as part of a device pairing process between a first device and a second device. A device pairing process may occur, for example, the first time a first device and a second device attempt to establish a wireless connection. A device pairing process may be used to establish one or more settings for the connection between the two devices including authentication settings, available device services, and other technical information. In response to a successful device pairing of two devices, each device may store any established connection settings related the other device and may use the stored connection settings in subsequent connections with the other device.

In Step 204, a signal strength value of the first wireless signal transmission is determined. In an embodiment, the signal strength value may indicate an absolute power (e.g., as measured in dBm or other units) of the first wireless signal transmission as it is received at the first device. In general, a first device may detect that the power of a wireless signal transmitted from a second device is less than the power at which the second device transmitted the wireless signal due to signal attenuation factors including the distance between the devices and any other signal interference that may exist. Wireless logic in the first device may be configured to determine and generate one or more values representing the signal strength of wireless connections between the first device and the second device and to provide the one or more values to other logic or programs.

In an embodiment, a first device may determine a signal strength value of a wireless signal transmission sent from a second device by retrieving a received signal strength parameter stored as part of connection parameters maintained by the first device for the connection between the first and second device. The first device may request the signal strength parameter value, for example, by requesting the value from wireless logic of the first device.

In an embodiment, wireless logic of a device, such as the first or second device, may comprise default logic configured to modify the transmit power of the device in response to detecting changes in the quality of a connection with another device. For example, during a wireless connection established between the first device and a second device, the second device may detect that the received strength of a signal transmitted by the first device is decreasing. A decrease in the measured received signal strength may indicate an increase in signal attenuation; for example, the attenuation may be due to the distance between the devices increasing or other signal interference. In response to detecting the decreased received signal strength, default logic of the second device may be configured to increase the strength of the signal transmitted from the second device in order to compensate for the decrease in overall connection strength. Similarly, the second device may detect at some other point in time during the connection that the received strength of the signal transmitted by the first device is increasing, possibly indicating that the devices have moved closer in relative distance to each other. In this instance, the second device may be configured to decrease the second device's transmitted signal strength in order to conserve device power and to reduce interference with other devices.

As a result of these dynamic modifications of the second device's transmitted signal power, the first device may be able to maintain a more constant received signal power level, and vice versa. Because the default logic causes the received signal power level to fluctuate less as the devices move relative to each other in physical space than it would otherwise, information about the strength of the received wireless signal at each devices may serve as an unreliable indicator of relative physical distance between the devices.

In an embodiment, in response to establishing a connection with the first device, the second device may be configured to maintain a constant wireless signal transmission power level with respect to the connection with the first device. For example, when the wireless communication method is Bluetooth, the wireless logic of the second device may determine a transmit power level of the second device at some point during a device pairing process with the first device and cause the second device to transmit at that same transmit power level for the duration of the connection. In an embodiment, it may be useful to cause the second device to maintain a constant transmit power level instead of enabling dynamic transmit power levels in order to enable the first device to analyze characteristics of signals received from the second device without considering possible modifications to second device's transmit power during the connection, as described above.

In one embodiment, the second device may be configured to maintain a constant transmit power level by modifying one or more entries in a transmit power table stored on the second device. For example, the second device may be configured to assign a particular transmit power level value to each entry in the transmit power table. In this manner, when wireless logic of the second device looks up an entry in the transmit power table in response to detected network conditions, the second device is caused to at the particular transmit power level for any evaluated power table entry.

In an embodiment, it may be assumed that device pairing processes occur between any two devices at an approximate baseline distance. In an embodiment, the first signal transmit power value may be associated with the baseline distance. For example, it may be determined that, in general, devices in an initial device pairing process are separated from each other at a distance of approximately three (3) meters and, thus, a first signal transmit power value may be associated with a distance of three meters. In an embodiment, the baseline distance may be used as a baseline point from which to make relative determinations of distance based on increases or decreases in received signal strength, as further described herein. The baseline distance may be configured for particular use cases, based on user configuration, or determined in any other manner.

In Step 206, a second wireless signal transmission is received. The second wireless signal transmission may, for example, be any transmission received as part of the connection established between the devices. In Step 208, a signal strength value of the second wireless signal transmission is determined. For example, the signal strength value of the second wireless signal transmission may be determined by determining the value of the received signal strength connection parameter value at or near the time the second wireless signal transmission is received.

In Step 210, based on a difference between the first signal strength value and the second signal strength value, a second approximate distance value representing a distance relative to the first approximate distance value is determined. For example, if the second signal strength value is less than the first signal strength value, a second approximate distance value may be determined. The second approximate distance value may thus be approximated as a value less than the baseline distance. For example, if the second signal strength value is less than the first signal strength by a factor of two, the distance between the devices may be estimated to have increased by a factor of two.

In an embodiment, after the determination in Step 210, the first device may continue receiving wireless signal transmissions in Step 404 for further determinations of approximate physical distances between the two devices as the devices may change physical locations.

In an embodiment, determining an approximate physical distance between two devices may indicate the occurrence of an activity between users associated with the devices. For example, assuming that a non-human animal (e.g., a pet animal) is associated with the first device and a human user is associated with the second device, determining that the second device is at an approximate distance that is closer than the baseline distance, or an approximate distance that is closer than a distance at which the device was previously determined to be located at, may indicate that the user of the second device has initiated some type of interaction with a user of the first device (e.g., a human has engaged a pet animal by petting or otherwise caring for the animal).

In Step 212, the second approximate distance value is stored in a data repository. For example, the second approximate distance value may be stored as part of a log file or other data format for further analysis. The logged values may be periodically transmitted to another device for storage in a data repository, e.g., data repository 124. In an embodiment, the second approximate distance value may be recorded in association with data representing the occurrence of an interaction. For example, if the second approximate distance value is less than a specified threshold value, the second approximate distance value may be recorded in association with data indicating that an interaction between users of the first and second devices.

In another embodiment, a first device and/or a second device of a wireless connection may log transmit power values and/or receive power values, generally referred to as wireless connection strength values, determined by the devices during the wireless connection. The logged transmit power values and/or receive power values may be sent from one device to the other device to analyze variations in the power values and to correlate the variations to changes in distance between the devices. For example, a tracking device 102 periodically may send a logged transmit power value and/or receive power value to a mobile device 104. Mobile device 104 may analyze the received transmit power values and/or receive power values to determine whether tracking device 102 is nearer or farther from the mobile device 104 based on a baseline power value.

For example, a first device may receive a first wireless connection strength value (e.g., a transmit power value or a receive power value) from a second device. The first device may associate the first wireless strength value with a first approximate distance value, for example, based on an approximate distance of devices during an initial connection, as described above. The first device may subsequently receive a second wireless connection strength value from the second device. Based on the relative difference between the first wireless connection strength value and the second wireless connection strength value, the first device may determine a second approximate distance value representing a distance relative to the first approximate distance value. For example, if the first wireless connection strength value represents a first transmit power value of the second device, and the second wireless connection strength value represents a second transmit power value of the second device and the second wireless connection strength value is greater than the first wireless connection strength value, the first device may determine that distance between the first device and the second device has increased by an amount relative to the increase in the wireless connection strength values.

In another embodiment, the logged wireless connection strength values may be sent to a centralized server, such as application server 122, for further analysis. The logged values each may be associated with a timestamp or other value indicating when the logged values were recorded by a particular device. The logged values may be used by the centralized server to determine approximate distances between the first device and the second device. For example, an application server 122 may analyze the logged values based on the associated timestamp values in order to determine increases and decreases in the receive power and/or transmit power at particular times, indicating corresponding increases and/or decreases in the distance between the devices.

Figure 3:
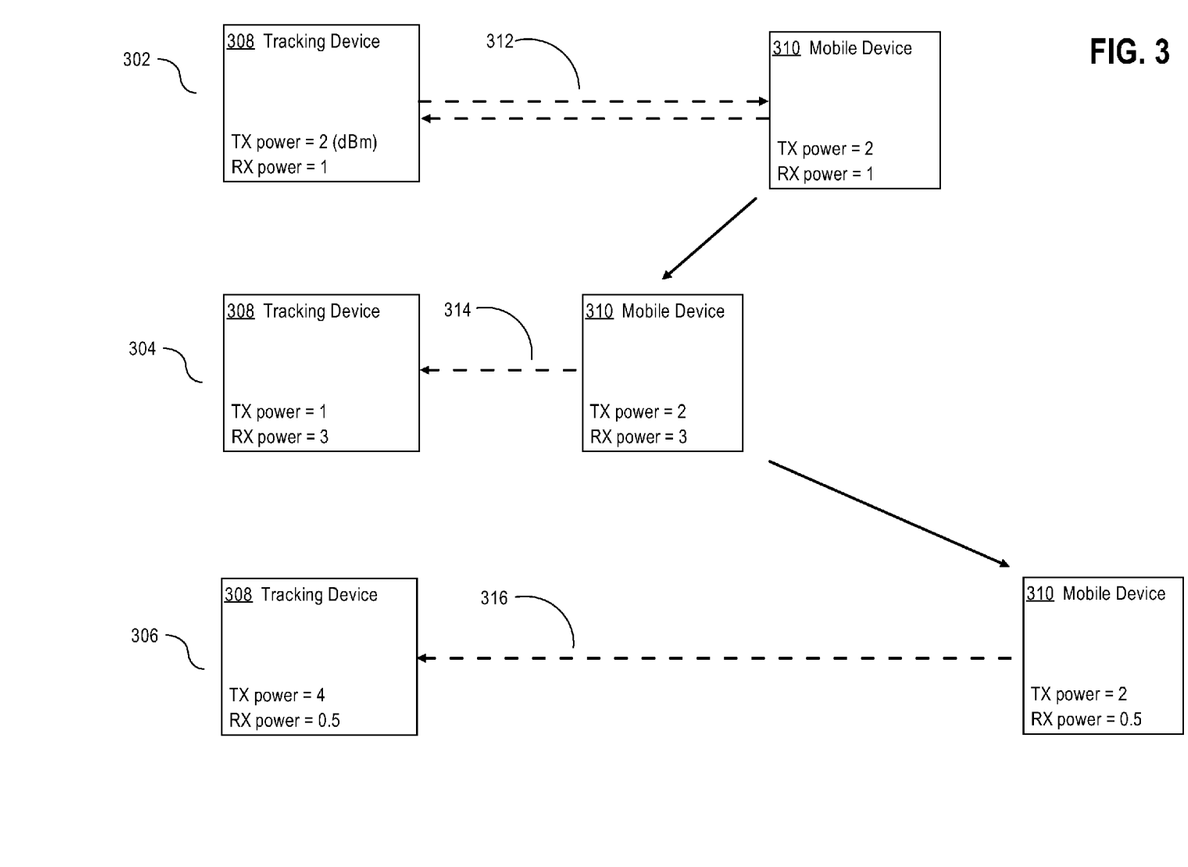
FIG. 3 illustrates example arrangements of two wireless computing devices at various physical distances.

FIG. 3 illustrates example arrangements of two wireless computing devices at various physical distances. In particular, FIG. 3 illustrates three example arrangements 302, 304, 306 of a tracking device 308 and a mobile device 310. The tracking device 308 may be associated, for example, with a non-human animal and the mobile device 310 may be associated with a human person that is occasionally in the physical proximity of the non-human animal. In an embodiment, FIG. 3 illustrates an example application of a process of determining an approximate physical distance between two devices, as described above.

In an embodiment, arrangement 302 illustrates a tracking device 308 and a mobile device 310 at an initial distance from one another. Tracking device 308 and mobile device 310 are associated with a wireless connection that includes wireless signal transmissions 312. For example, the wireless signal transmissions 312 may represent signals transmitted during a device pairing process between tracking device 308 and mobile device 310. Each of the illustrations of tracking device 308 and mobile device 310 in arrangements 302, 304, 306 includes a transmit power value (TX power) and a receive power value (RX power), the values representing example connection parameter values of each device during the illustrated connection between the devices. The signal power values illustrated in FIG. 3 are provided only for the purposes of providing a clear example, and actual wireless signal power values may vary depending on the type of devices, the actual distance between the devices, and any number of other factors.

In arrangement 302, tracking device 308 receives a first wireless signal transmission 312 from mobile device 310. In an embodiment, tracking device 308 may determine a signal strength value of the received wireless signal transmission by retrieving a signal strength parameter stored as part of connection parameters maintained by tracking device 308. For example, in arrangement 302, wireless logic of tracking device 308 may indicate a signal strength value of 2 dBm for a wireless signal transmission received from mobile device 310.

In an embodiment, mobile device 310 may be configured to maintain a constant transmission power level with respect to a connection between tracking device 308 and mobile device 310, as illustrated by the constant transmission power level of 2 dBm of mobile device 310 in each of arrangements 302, 304, 306. In an embodiment, the signal strength value of the first wireless signal transmission received from mobile device 310 may be associated with a baseline distance value (e.g., 3 meters). In other words, in the example of FIG. 3 it may be assumed that the distance between tracking device 308 and mobile device 310 is 3 meters at the time that tracking device 308 receives wireless signal transmissions 312 and that wireless signal transmissions received by tracking device 308 from mobile device 310 at a distance of 3 meters are received at a power level of 2 dBm.

Arrangement 304 illustrates a second example arrangement of tracking device 308 and mobile device 310, illustrating an arrangement of the devices at a shorter distance from each other relative to arrangement 302. In arrangement 304, tracking device 308 receives a second wireless signal transmission 314 transmitted from mobile device 310. For example, wireless signal transmission 314 may be any wireless signal transmitted from mobile device 310 as part of the connection between tracking device 308 and mobile device 310.

In an embodiment, tracking device 308 determines a signal strength value of wireless signal 314, for example, by retrieving a received signal strength parameter from wireless logic of tracking device 308. In the example of FIG. 3, tracking device 308 indicates that the received signal strength value of the second wireless transmission signal 314 is 3 dBm.

In an embodiment, based on a difference between the first signal strength value and the second signal strength value (e.g., a difference between the first signal strength value of 1 dBm in arrangement 302 and the second signal strength value of 3 dBm in arrangement 304), a second approximate distance value may be determined. For example, it may be determined in FIG. 3 that the threefold increase in the signal strength of the second wireless signal transmission 314 relative to the signal strength of the first wireless signal transmission 312 indicates a threefold decrease in distance between the devices. This information may be used, for example, to determine an approximate distance value relative to the baseline distance. For example, it may be determined that the second approximate distance value is a distance of 1 meter (i.e., one-third of the example baseline distance of 3 meters). The previous example calculation assumes a linear relationship between physical distance and received signal power strength and is provided only as an example; calculations may be based on other approximated relationships between wireless signal power levels and the physical distance between devices.

Arrangement 306 illustrates a third example arrangement of a tracking device 308 and a mobile device 310. In the example arrangement 306, the two devices are located at a greater distance from each other than in both arrangement 302 and arrangement 304. In arrangement 306, tracking device 308 receives a wireless signal transmission 316 from mobile device 310 and determines a signal strength value of 0.5 dBm for wireless signal transmission 316. In the example of arrangement 306, based on the fourfold decrease between the first signal strength value of 2 dBm and the second signal strength value of 0.5 dBm, it may be determined that mobile device 310 is now at a distance that is four times greater than the baseline distance (12 meters). In the examples above, the second approximate distance values may be stored in a data repository for further analysis.

3.2 Detecting Device Co-Location

Figure 4:
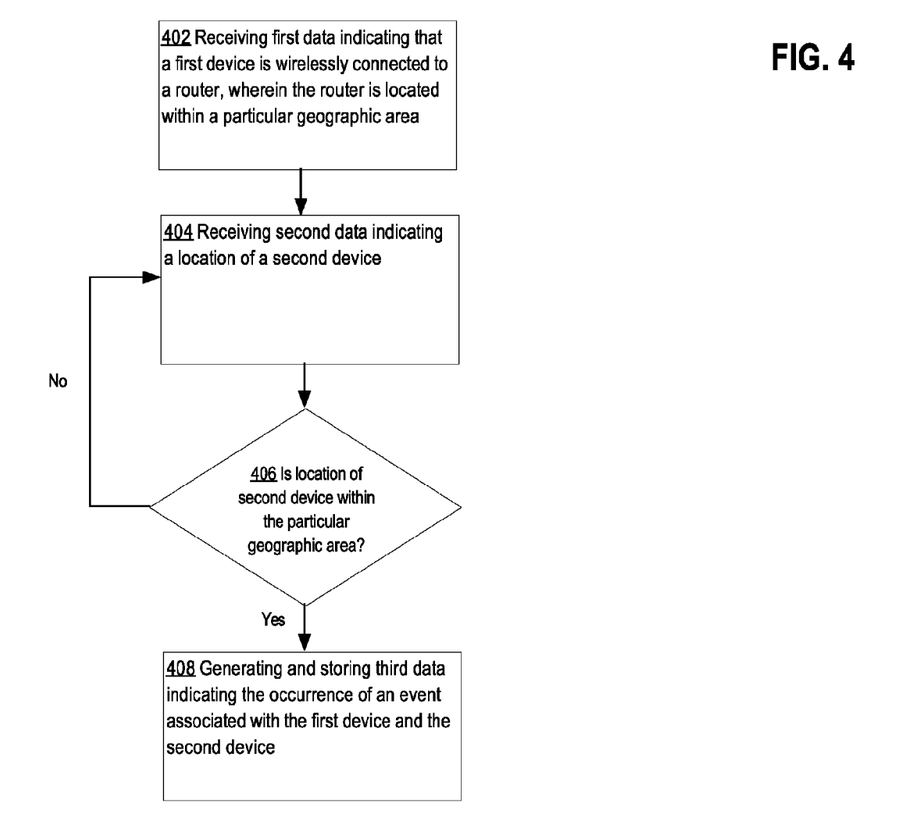
FIG. 4 illustrates a process of detecting whether two or more computing devices are co-located within a particular geographic area, according to an embodiment.

In an embodiment, proximity relationships between animals may be determined by detecting the co-location of devices associated with the animals. FIG. 4 illustrates a process of detecting whether two or more computing devices are co-located within a particular geographic area, according to an embodiment. In an embodiment, one or more of the steps described below may be omitted, repeated, or performed in a different order. The specific arrangement shown in FIG. 4 is not required.

In Step 402, first data is received indicating that a first device is wirelessly connected to a router. For example, the first device may be a tracking device and the first data may be sent by the tracking device to an application server to indicate that the tracking device is wirelessly connected to a particular router, such as router 118. In an embodiment, the tracking device may be configured to send the first data to the application server in response to the tracking device establishing a connection with a router, periodically during the tracking device's connection with the router, or at any other time. The first data may comprise one or more values that indicate that the first device has established a connection with a particular router including, for example, an IP address of the router, a service set identifier (SSID) of a wireless network associated with the router, one or more media access control (MAC) addresses of the router, or any other value identifying the router. An application server receiving the first data may store the data in a data repository such as data repository 124.

In an embodiment, the router to which the first device is connected is associated with a particular geographic area. The particular geographic area may indicate a general geographic area in which the router physically is located. In an embodiment, the particular geographic area associated with the router may be based on user-supplied configuration information or based on other information known about the router. For example, a user that owns or is otherwise associated with the router may register and identify a geographic area associated with the router using a web-based portal provided by an application server, such as application server 122. The geographic area may be identified, for example, by selecting an area on a map display, supplying geographic coordinates, or providing other input indicating a geographic area. In another embodiment, the geographic area associated with the router may be based on an IP address of the router or other router identifying information.

In Step 404, second data is received indicating a location of a second device. For example, the second device may be a mobile device and the second data may be generated by be mobile device based on data received from location sensors of the mobile device and sent to a centralized server such as application server 122. In an embodiment, the second data may comprise geographic coordinates generated by GPS components of the second device or any other location identifying values. In another embodiment, the second data may comprise information indicating that the second device is connected to a particular router. The second device may be configured to send the second data periodically, in response to detecting that the second device has moved a certain distance, or at any other time.

In Step 406, it is determined whether the location of the second device is within the particular geographic area. For example, if the second data comprises geographic coordinates such as latitude and longitude values, the determining step may comprise determining whether the geographic coordinates indicate a location that is within the particular geographic area associated with the router. As another example, if the second data comprises information indicating that the second device is connected to a particular router, the determining step may comprise determining whether the particular router is the same router that the first device is connected to, or that the particular router is within the particular geographic area. In an embodiment, the determining step may comprise of determining whether the first data and the second data are received within a particular time period, indicating that the first device and the second device are co-located within the particular geographic area within a particular range of time.

If it is determined in Step 406 that the location of the second device is not within the particular geographic area, the process may return back to Step 404 to await receipt of additional second data from the second device. A determination that the second device is not within the particular geographic area may indicate, for example, that the first device and the second device are not currently co-located and, consequently, that an interaction currently is not occurring between animals that may be associated with the first device and the second device.

If it is determined in Step 406 that the location of the second device is within the particular geographic area, in Step 408, third data is generated and stored, the third data indicating the occurrence of an event associated with the first device and the second device. In an embodiment, the third data may comprise any information associated with detecting that the second device is located in the particular geographic area. For example, the third data may comprise information identifying the first device, the second device, a timestamp, and any other information, and may be stored by an application server in a data repository, such as data repository 124.

In an embodiment, the determination performed in step 406 generally may be performed at any time subsequent to receiving data from a first device and a second device. For example, data may be received from a first device and second device over a period of time and stored in a data repository. Each of the data items received may be associated with a timestamp or other indication of a time at which the data items were generated by the first device and second device and/or when the data items are received and stored. Based on the received data items and associated timestamps, it may be determined whether a data item received from a first device and a data item received from a second device were co-located within a specified period of time.

For example, one or more first data items may be received from a first device indicating locations of the first device at particular times. One or more second data items may be received from a second device indicating locations of the second device at other particular times. The data items received from the first device and the second device may initially be stored in a data repository for subsequent processing. In an embodiment, the stored data may be processed to determine whether any of the stored data indicates that the devices were co-located within a specified geographic area and within specified period of time. For example, in one embodiment, the data stored in the data repository may be searched for data item pairs that are associated with the first device and second device, respectively, and that are associated with location data and timestamp data that fit certain criteria. For example, data item pairs may be located that include data items associated with location data that is within a particular distance of one another, and are also each associated with a time value that is within a particular time period of one another. In response to determining the data item pairs, third data may be generated indicating an occurrence of an event between the first device and the second device. In the preceding example, interactions are detected between a first device and a second device; however, a centralized application server generally may receive and process data for detecting interactions between any number of devices.

In an embodiment, the event represented by the third data may indicate an interaction involving a user of the first device and a user of the second device. For example, if the first device is a tracking device associated with a pet animal and the second device is a mobile device associated with a pet owner, the third data may indicate that the interaction of the pet owner returning home where the pet is located has occurred.

4.0 Example Implementation Mechanism—Hardware Overview

Figure 5:
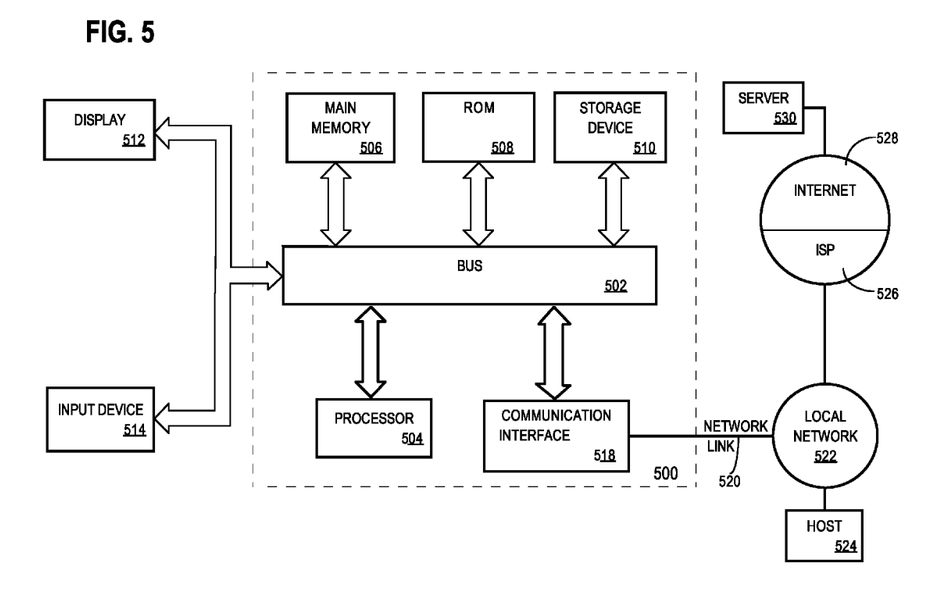
FIG. 5 illustrates an example of a computer upon which one or more embodiments may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. In other embodiments, a display 512 may represent LED indicator lights and other electronic displays. An input device 514, including alphanumeric and other keys, touchscreen sensors, and device buttons, is coupled to bus 502 for communicating information and command selections to processor 504.

The invention is related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining an approximate physical distance between a first device and a second device, the method comprising:
   receiving, at a first device, a first wireless signal transmission from a second device;
   determining a first signal strength value of the first wireless signal transmission, wherein the first signal strength value is associated with a first approximate distance value;
   wherein the first approximate distance value represents an approximate physical distance of the first device from the second device;
   receiving, at the first device, a second wireless signal transmission from the second device;
   determining a second signal strength value of the second wireless signal transmission;
   determining, based on a difference between the first signal strength value and the second signal strength value, a second approximate distance value representing a distance relative to the first approximate distance value;
   storing the second approximate distance value and an associated timestamp in a data repository, wherein the data repository comprises a plurality of approximate distance values and associated timestamps;
   determining, for a specified timeframe using the plurality of approximate distance values and associated timestamps, an amount of time in which the first device is within a specified distance of the second device;
   wherein the steps are performed by one or more computing devices.

2. The method of claim 1, wherein the first device or the second device is configured to maintain a constant wireless signal transmit power level.

3. The method of claim 2, wherein the second device is configured to maintain a constant transmit power level by assigning a particular transmit power level value to two or more rows in a transmit power table stored on the second device.

4. The method of claim 1, wherein the wireless connection is a Bluetooth connection and the first wireless signal transmission is part of a device pairing process.

5. The method of claim 1, wherein the second approximate distance value indicates a particular activity between a first user of the first device and a second user of the second device.

6. The method of claim 1, wherein the first device is a tracking device attached to a non-human animal and the second device is a mobile device.

7. A non-transitory computer-readable medium storing one or more sequences of instructions, which when executed by one or more processors, cause the one or more processors to carry out the steps of:

receiving, at a first device, a first wireless signal transmission from a second device;

determining a first signal strength value of the first wireless signal transmission, wherein the first signal strength value is associated with a first approximate distance value;

wherein the first approximate distance value represents an approximate physical distance of the first device from the second device;

receiving, at the first device, a second wireless signal transmission from the second device;

determining a second signal strength value of the second wireless signal transmission;

determining, based on a difference between the first signal strength value and the second signal strength value, a second approximate distance value representing a distance relative to the first approximate distance value;

storing the second approximate distance value and an associated timestamp in a data repository, wherein the data repository comprises a plurality of approximate distance values and associated timestamps;

determining, for a specified timeframe using the plurality of approximate distance values and associated timestamps, an amount of time in which the first device is within a specified distance of the second device.

8. The non-transitory computer-readable medium of claim 7, wherein the second device is configured to maintain a constant wireless signal transmit power level.

9. The non-transitory computer-readable medium of claim 8, wherein the second device is configured to maintain a constant transmit power level by assigning a particular transmit power level value to two or more rows in a transmit power table stored on the second device.

10. The non-transitory computer-readable medium of claim 7, wherein the wireless connection is a Bluetooth connection and the first wireless signal transmission is part of a device pairing process.

11. The non-transitory computer-readable medium of claim 7, wherein the second approximate distance value indicates a particular activity between a first user of the first device and a second user of the second device.

12. The non-transitory computer-readable medium of claim 7, wherein the first device is a tracking device attached to a non-human animal and the second device is a mobile device.

13. A computer-implemented method for determining an approximate physical distance between a first device and a second device, the method comprising:

receiving, at a first device, a first wireless connection strength value from a second device, wherein the first wireless connection strength value is associated with a first approximate distance value;

wherein the first approximate distance value represents an approximate physical distance of the first device from the second device;

receiving, at the first device, a second wireless connection strength value from the second device;

determining, based on a difference between the first wireless connection strength value and the second wireless connection strength value, a second approximate distance value representing a distance relative to the first approximate distance value;

storing the second approximate distance value and an associated timestamp in a data repository, wherein the data repository comprises a plurality of approximate distance values and associated timestamps;

determining, for a specified timeframe using the plurality of approximate distance values and associated timestamps, an amount of time in which the first device is within a specified distance of the second device;

wherein the steps are performed by one or more computing devices.

14. The method of claim 13, wherein the first wireless connection strength value is a transmit power value or a receive power value.

15. The method of claim 13, wherein the second approximate distance value indicates a particular activity between a first use of the first device and a second user of the second device.

16. A computer-implemented method for determining an approximate physical distance between a first device and a second device, the method comprising:

receiving, at a first device, a first wireless signal transmission from a second device;

determining a first signal strength value of the first wireless signal transmission, wherein the first signal strength value is associated with a first approximate distance value;

wherein the first approximate distance value represents an approximate physical distance of the first device from the second device;

receiving, at the first device, a second wireless signal transmission from the second device;

determining a second signal strength value of the second wireless signal transmission, wherein the second signal strength value is associated with a second approximate distance value;

storing the first approximate distance value and a first associated timestamp and the second approximate distance value and a second associated timestamp in a data repository, wherein the data repository comprises a plurality of approximate distance values and associated timestamps;

determining, for a specified timeframe using the plurality of approximate distance values and associated timestamps, an amount of time in which the first device is within a specified distance of the second device;

wherein the steps are performed by one or more computing devices.

17. The method of claim 16, wherein the first device or the second device is configured to maintain a constant wireless signal transmit power level.

18. The method of claim 16, wherein the wireless connection is a Bluetooth connection and the first wireless signal transmission is part of a device pairing process.

19. The method of claim 16, wherein the first device is a tracking device attached to a non-human animal and the second device is a mobile device.

20. A computer-implemented method comprising:

receiving, at a first device, a first wireless signal transmission from a second device;

storing a first record of the first wireless signal transmission and a first associated timestamp in a data repository, wherein the data repository comprises a plurality of records and associated timestamps;

receiving, at the first device, a second wireless signal transmission from the second device;

storing a second record of the second wireless signal transmission and a second associated timestamp in the data repository;

determining, for a specified timeframe using the plurality of records and associated timestamps, an amount of time in which the first device is within a specified distance of the second device;

wherein the steps are performed by one or more computing devices.

21. The method of claim 20, wherein the first device or the second device is configured to maintain a constant wireless signal transmit power level.

22. The method of claim 20, wherein the wireless connection is a Bluetooth connection and the first wireless signal transmission is part of a device pairing process.

23. The method of claim 20, wherein the first device is a tracking device attached to a non-human animal and the second device is a mobile device.

* * * * *